G. H. ARMITAGE.
MACHINE FOR MAKING SHOE LACES AND THE LIKE.
APPLICATION FILED SEPT. 20, 1918.

1,423,984.

Patented July 25, 1922.
9 SHEETS—SHEET 1.

Inventor:
George H. Armitage,
by Joseph T. Brennan
Atty.

G. H. ARMITAGE.
MACHINE FOR MAKING SHOE LACES AND THE LIKE.
APPLICATION FILED SEPT. 20, 1918.

1,423,984. Patented July 25, 1922.
9 SHEETS—SHEET 5.

UNITED STATES PATENT OFFICE.

GEORGE H. ARMITAGE, OF LINCOLN, RHODE ISLAND, ASSIGNOR TO UNITED LACE & BRAID MANUFACTURING COMPANY, OF AUBURN, IN THE TOWN OF CRANSTON, RHODE ISLAND, A CORPORATION OF RHODE ISLAND.

MACHINE FOR MAKING SHOE LACES AND THE LIKE.

1,423,984.      Specification of Letters Patent.      Patented July 25, 1922.

Application filed September 20, 1918. Serial No. 254,991.

*To all whom it may concern:*

Be it known that I, GEORGE H. ARMITAGE, a subject to the King of Great Britain, residing at Lincoln, in the county of Providence and State of Rhode Island, have invented certain new and useful Improvements in Machines for Making Shoe Laces and the like, of which the following is a specification.

This invention relates to machines for making shoe laces and the like and it has for its object to provide an improved machine of this kind.

The invention consists of a machine for making shoe laces and the like characterized by the peculiar features of construction and mode of operation set forth in the following description and particularly pointed out and defined in the claims at the close thereof.

The invention further consists in certain features of construction, combinations and arrangements of parts more particularly pointed out in the description and claims.

In the accompanying drawings:—

The machine herein shown and described operates upon a continuous length of cord, tape or the like and a continuous strip of thin sheet metal to produce individual laces of given or predetermined length, each provided at its ends with beaded metal tips.

In its operation the machine draws the cord or tape from the cord supply and presents a measured stretch thereof to mechanism which wraps a piece of sheet metal around the same in a tubular shape, said metal wrapping having a length equal to twice the length of one of the tips referred to. After this tube applying operation, the metal tube surrounding the cord is crimped annularly or beaded, as it is called, to fasten the metal tube to the cord and the latter and the metal tube are cut transversely at the middle of said tube, thus completing one end of each of two laces simultaneously.

Figures 23, 24, 25, 26, 27, 28:
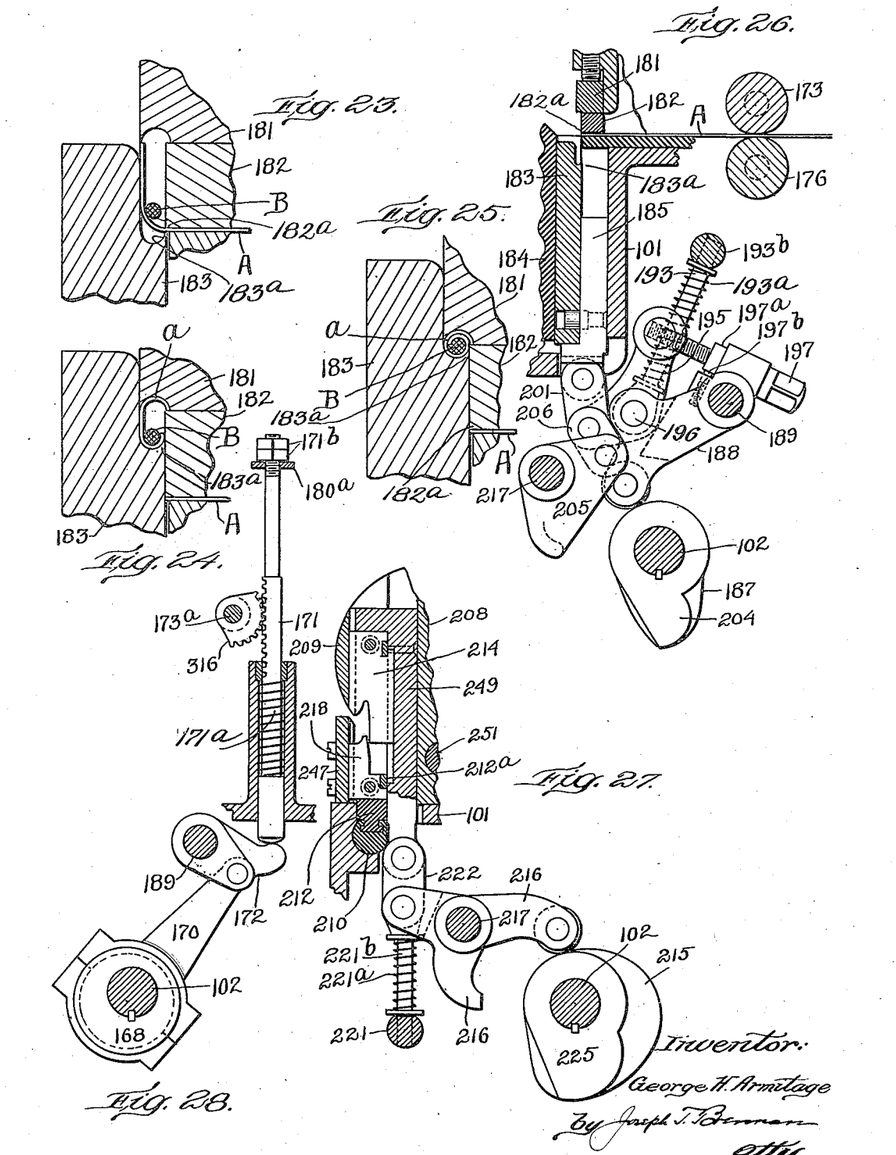
Figures 23, 24 and 25 illustrate the operation of the tipping dies.
Figure 26 is a sectional detail of the metal cutting and tip applying mechanism.
Figure 27 is a sectional detail of the beading mechanism.
Figure 28 is a sectional detail relating to the metal strip feeding mechanism.

The metal strip, shown at A, is intermittently fed forward from a supply roll (not shown) by two feed rolls 173 and 176 each provided at its ends with integral trunnions supported in bearings. The trunnions of the lower feed roll 176 are journaled in fixed bearings on the frame of the machine while the trunnions of the upper feed roll 173 are journaled in bearings in cylindrical blocks 174 slidable vertically in chambers provided in the frame of the machine and yieldingly pressed toward the lower roll 176 by springs. The trunnion 173$^a$ of the lower roll 176 is extended to the outside of the frame and has fixed upon it a ratchet wheel 318, Figures 5 and 14, engaged by a spring pressed detent 317$^a$ pivotally mounted upon the frame of the machine, and by a pawl 317 pivotally mounted upon an arm 316$^a$ projecting from the hub of a segment 316 loosely mounted upon said extended trunnion. Segment 316, see Figure 28, is in engagement with a rack bar 171 supported in bearings on the frame, whose lower end abuts against a lever 172 fulcrumed on a cross-bar 189 supported at its ends by the frame of the machine. Lever 172 is connected by strap 170 with an eccentric 168 fast on the main shaft 102. A spring 171$^a$ yieldingly urges rack-bar 171 downwardly so that said bar rises and falls with lever 172 as the latter is vibrated by eccentric 168.

The main cam shaft 102 makes one revolution for each series of operations which results in the presentation of a stretch of the cord to the tube applying mechanism, the application of a metal tube to said cord and the transfer of the stretch of cord with the tube upon it to the crimping and cutting mechanism, said last mentioned mechanism being also automatically operated once during each rotation of the main cam shaft 102, but acting upon the tube and cord transferred to said crimping and cutting mechanism during the preceding rotation of the main cam shaft 102. Thus the complete cycle of the machine involves two revolutions of the main cam shaft 102. It will be clear also that during each revolution of the main cam shaft the rack bar 171 is raised and lowered once, and that the upward movement of the rack bar when thus lifted by the lever 172 acts through segment 316, arm 316$^a$, pawl 317 and ratchet wheel 318 to partially rotate the lower feed roll 176 and feed the metal strip A forward a measured distance determined by the adjustment of nuts 171$^b$, provided upon the upper end of rack bar 171, said nuts co-operating with an ear 180$^a$ projecting from the top section 180 of the frame to limit the downward movement of the bar.

Figure 11:
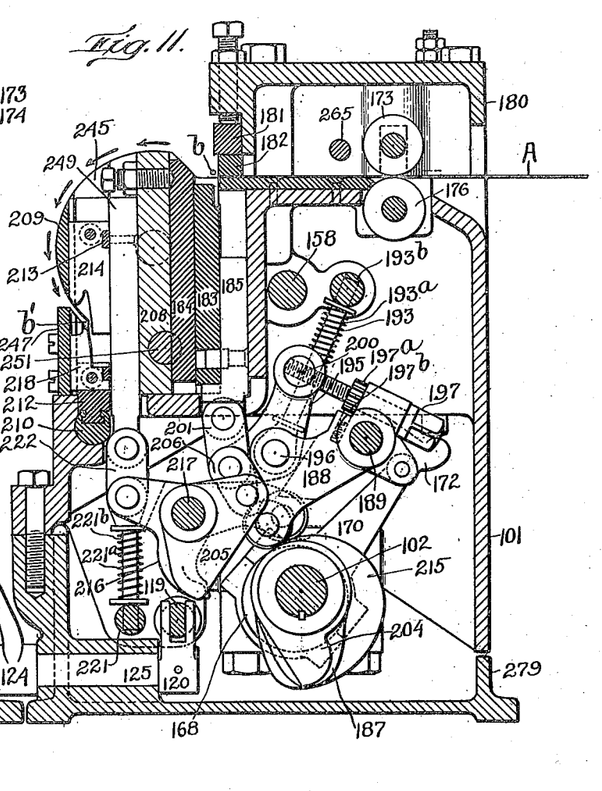
Figure 11 is a section on line 11—11 of Figures 4 and 5.

This feeding movement is imparted to the metal strip A at the start of the series of operations referred to, and acts to move the advance end of the strip forward into position immediately above a vertically movable die member 183, Figures 11 and 26. The die member 183 is made with a transverse cutting edge 183$^a$ co-operating with a cutting edge 182$^a$ provided upon a stationary die member 182 fixed in position on the frame of the machine.

Figure 12:
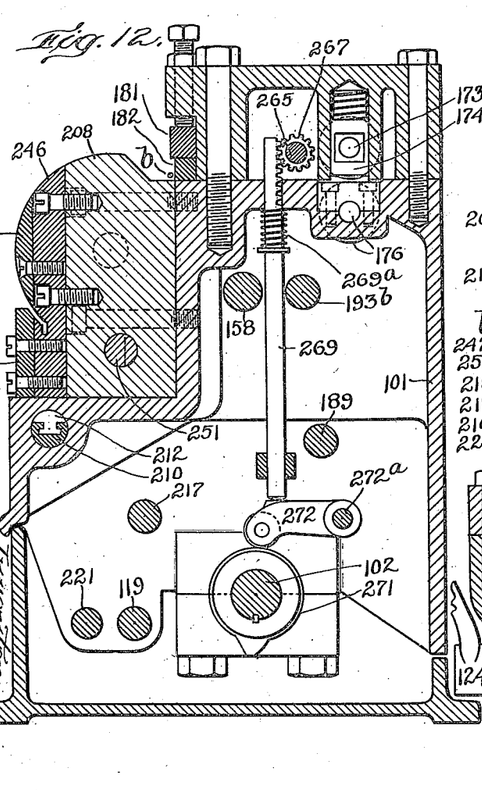
Figure 12 is a section on line 12—12 of Fig. 5.

As the metal strip A is advanced as described a stretch of the cord, drawn from the supply, is placed in position across the front of the machine by a reciprocating shuttle or carriage 281, Figures 1, 2, 7 and 10, so that it occupies the position indicated at $b$ in Figures 11 and 12, after which the die member 183 moves upwardly, cutting a measured length from the end of metal strip A and wrapping said severed length around the cord as illustrated in Figures 23, 24 and 25. After performing the cutting and wrapping operations illustrated in said figures the die member 183 is lowered and the cord with the metal tube upon it is transported bodily sidewise from the position at $b$ to the position indicated at $b'$ in Figure 11 where it remains unacted upon until the next series of operations of the machine occur.

The path of the stretch of the cord when thus moved bodily sidewise from position $b$ to position $b'$ is indicated by arrows in Figure 11.

During each series of operations of the machine, and at about the same time that the die member 183 is actuated to cut the metal clip A and wrap the cut-off portion around the card as described, a vertically movable slide 249 is actuated and acts, through the instrumentalities described later, to crimp or "bead" the metal tube onto the cord that was left at position $b'$ during the preceding series of operations, and to sever the cord and tube at the middle of the latter so as to simultaneously complete ends of two laces.

The die member 183 is mounted upon and moves with a vertically movable slide 185 connected at its lower end, by a pair of links 201, with a lever made up of two relatively adjustable but rigidly connected sections or parts 188 and 195, Figures 11 and 26. The lever section 188 is fulcrumed upon a cross-bar 189 and carries a cam roll co-operating with a cam 187 fast on main cam shaft 102. The lever section 195 is pivotally connected to section 188 at 196, one arm of the section 195 carrying a swiveled cylindrical nut 200 engaged by the threaded end of a screw 197. Screw 197 has a smooth shank rotatably mounted in a hole provided through the hub of section 188 within which hole it is held against endwise movement by the head of the screw 197 and a star wheel 197$^a$ fastened to said shank. This star or ratchet wheel is engaged by a spring pressed pawl 197$^b$ which serves to hold the screw against rotative displacement except when manually and forcibly rotated for purposes of adjustment. Cam 187 acts through lever 188—195 and the pair of links 201 to raise slide 185 and die member 183 that is carried thereby, while another cam 204 immediately adjacent cam 187 acts through a lever 205, link 206 and links 201 to positively lower slide 185 and die member 183. Lever 205 is fulcrumed upon a cross-bar 217 supported at its ends by the frame section 101. As additional means to assist cam 204 I provide a spring 193$^a$ acting through a push rod 193 upon the pivot pin 196, said push rod being pivotally connected with a pin 196 at one end and having its other end slidably mounted in a hole provided transversely through a rod 193$^b$ journaled at its ends in bearings on frame section 101. This rod 193$^b$ serves also as an abutment for one end of the spring 193$^a$.

Figures 19, 20, 21, 22:
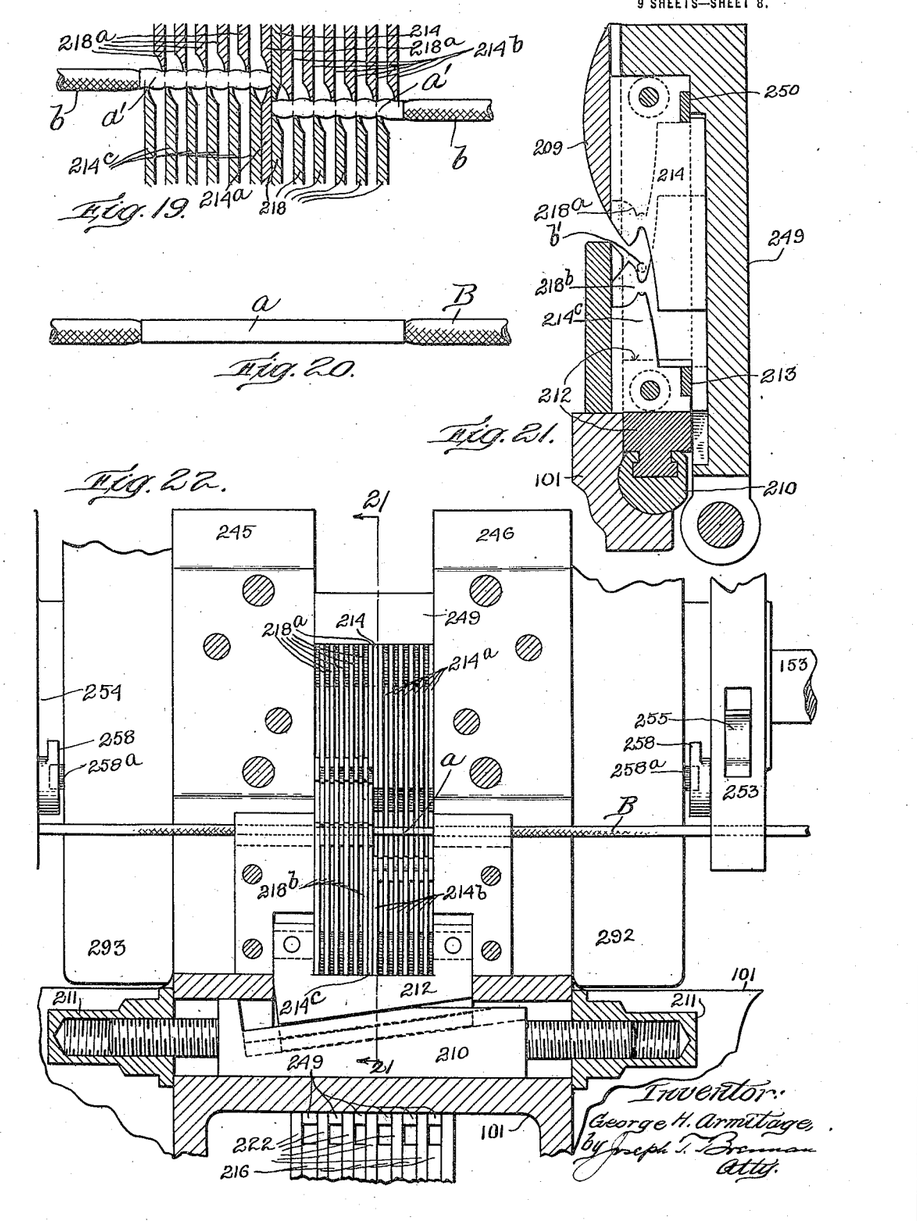
Figure 19 is a sectional detail illustrating the operation of the crimping or beading blades.
Figure 20 shows a portion of the cord or lace with a metal tube applied thereto, the latter being shown in its condition before it is acted upon by the beading blades as in Figure 19.
Figure 21 is a section on line 21—21 of Figure 22.
Figure 22 is a front elevation, with parts of the frame removed, of a portion of the machine showing the beading blades and adjacent parts.

The lower end of the slide 249 has pivotally connected to it the upper ends of seven links 222, Figures 22 and 27, whose lower ends are pivotally connected to one arm of a three-arm lever 216 fucrumed upon a cross-bar 217. Another of the arms of this lever carries a cam roll engaging a lifting cam 215 fast on main cam shaft 102. The third depending arm of this lever 216 co-operates with a return cam 225. The cam 215 acts through lever 216 and links 222 to lower slide 249 while the cam 225, assisted by a spring 221$^a$, acts through said lever and links to return said slide to its upper position again at the proper time. The spring 221$^a$ is mounted upon a push rod 221$^b$ pivotally connected at its upper end with lever 216 and guided at its lower end by a cross-bar 221 journaled at its ends in bearings on the frame section 101, said cross-bar serving as an abutment for one end of the spring.

The slide 249 carries a set of beading blades disposed upon the slide in two groups 214$^a$ and 218$^a$, the blades 214$^a$ being longer than the blades 218$^a$. Between the two groups 214$^a$ and 218$^a$ is provided a cutting blade 214 of the same length as the blades of group 214$^a$. The blades of these two groups are locked to slide 249 so as to move vertically with the latter by a key or rib 250 that is a rigid part of the slide 249, and are held against the slide and in engagement with this key or rib by a face plate 209 that is part of the frame of the machine. Immediately below the blades 214$^a$ and 218$^a$ is another set of blades disposed in two groups 214$^b$ and 218$^b$, the blades 218$^b$ being longer than the blades 214$^b$ and co-operating with the blades 218$^a$ while the blades 214$^b$ co-operate with the blades 214$^a$. Between the two groups 214$^b$ and 218$^b$ is arranged a cutting blade 214$^c$ co-operating with blade 214 of slide 249. With the exception of the three middle blades of each set, the blades are spaced apart a distance corresponding to the desired distance between the crimps that the blades are to produce when they act upon the metal tube at position $b'$.

The two middle blades 214 and 214$^c$ are offset so that when the slide 249 is lowered the lower end of the blade 214 passes beyond the upper end of blade 214$^c$ and close to the latter with the result that the two blades act as cutters and sever the metal tube and cord at that point just before the other blades of the two sets come together and crimp the metal tube. Of course the two blades 214 and 214$^c$ are substantially in the same vertical plane with the medial line of the strip A so that after a section of the latter has been removed from the advance end of the strip, wound around the cord and carried with the latter into the position at $b'$, the two blades referred to will sever the metal tube and cord at a point midway of the length of the tube. The cutting blades 214 and 214$^c$ co-operate, respectively, with the two innermost short blades 214$^b$ and 218$^a$ to crimp the extremities of the two tips produced by the severance of the metal tube and cord.

The blades of the lower set are fastened to a blade holder 212 provided upon its under side with an oblique T-shaped tongue occupying a T-shaped slot formed longitudinally but obliquely in a round bar 210 slidably mounted within a cylindrical bore provided in the frame section 101. The ends of the bar 210 are reduced and screw-threaded to receive upon them nuts 211, Figure 22, which, when tightened up, against the outside of frame section 101 hold bar 210 against endwise displacement. By means of these nuts 211, the bar 210 can be shifted endwise to adjust the holder 212 and the blades carried thereby, vertically, the oblique disposition of the tongue and groove connection between the bar and holder serving to move the latter up or down according to the direction in which the bar is moved.

Figure 4:
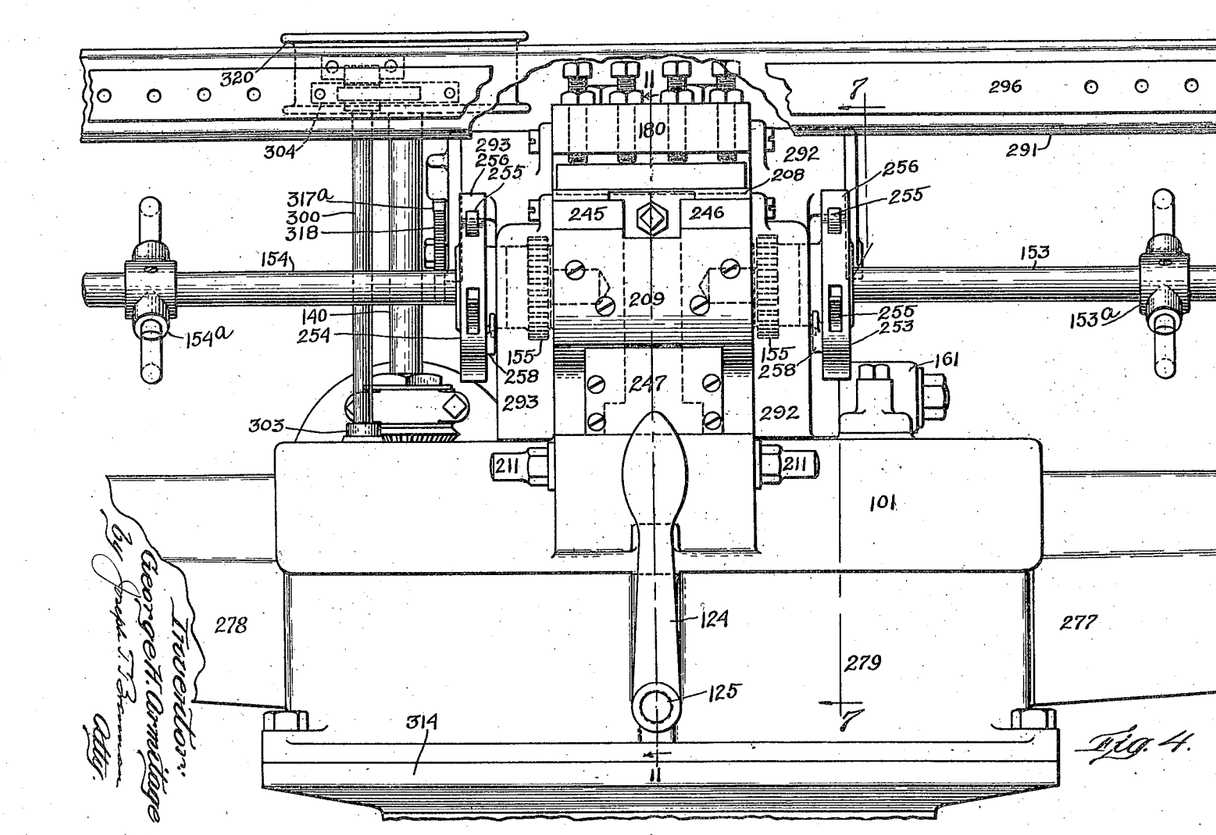
Figure 4 is a front elevation, on larger scale, of a portion of the machine shown in Figures 1 and 2.

The means for transferring the cord bodily from position $b$ to position $b'$ includes a pair of members 253 and 254, the former being fast on a shaft 153 and the latter fast on a shaft 154. These two shafts are in alinement relatively and are also alined with the center of the curved path, indicated by the arrows in Figure 11, through which the cord is moved bodily sidewise from position $b$ to position $b'$. Each transfer member 253 and 254 is made with two fixed jaws 256, Figure 8, positioned angularly 180 degrees apart, and carries two movable jaws 255, one adjacent each fixed jaw. Each movable jaw 255 is fastened to a small shaft 257 carrying at one end a rigid arm 258, Figures 4 and 27, that co-operates with a lug 258$^a$ on a frame, to effect the opening movements of the jaws 255 as they move away from position $b'$ so that the two finished lace ends are freed and fall away from the beading mechanism by gravity. Each movable jaw has pivotally connected to it one end of a link 259 that is connected at its other end with a spring pressed plunger 261 mounted, together with its spring, within a pocket formed in the transfer member. When the movable jaw is shifted from one extreme position to the other, the pivotal connection between said jaw and the link 259 is carried from a position at one side of the direction of thrust of the plunger into a position at the other side thereof. Thus it will be clear that the spring pressed plunger serves to hold the movable jaw in either of its two positions.

Figures 7, 8, 9, 10:
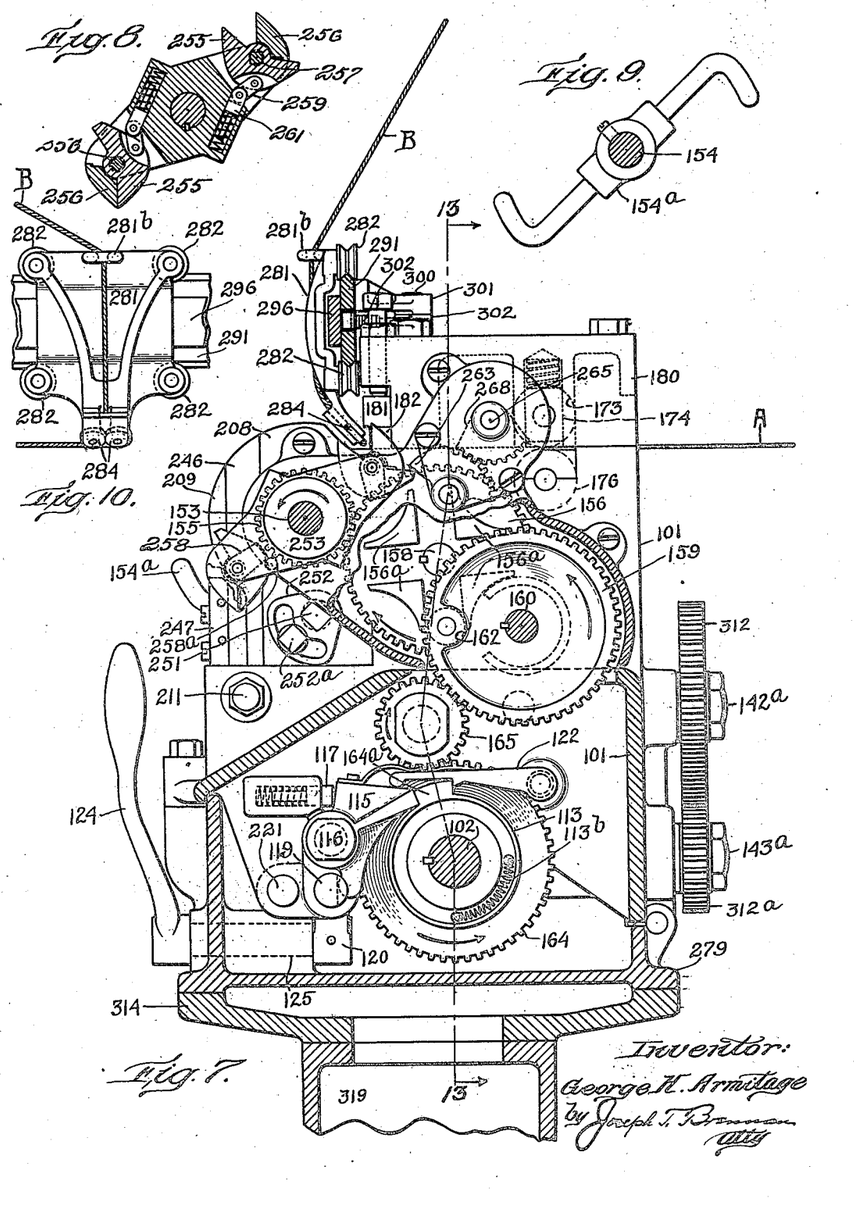
Figure 7 is a section on line 7—7 of Figures 4 and 13.
Figure 8 is a sectional view of one of the transfer members hereinafter described.
Figure 9 is a side elevation of one of the anchors hereinafter described.
Figure 10 is a front elevation of the shuttle hereinafter described.

The two transfer members 253 and 254 are intermittently actuated and when they come to rest one pair of jaws of each is, as shown in Figure 7, in open condition and in position to receive between them the stretch of cord that is laid across the machine by the shuttle 281 immediately preceding the operation of the die member 183. During the travel of the shuttle across the machine, the two open jaws of the transfer members are automatically closed as soon as the shuttle passes the second transfer member.

At the completion of the operation of the die member 183, and after the latter has been returned to its lowermost position again, the shafts 153 and 154 are rotated to the extent of one-half of a revolution, that is 180°, where they rest until near the completion of the next series of o rations. The means for imparting intermittent rotary motion to the shafts 153 and 154 includes two gears 155, Figures 4 and 7, each fast on one of said shafts. One of the gears 155 is engaged by a gear 156 secured to a shaft 158 journaled in bearings on the frame section 101 and the other gear 155 is engaged by a gear 157 fast upon the opposite end of shaft 158. The gear 156 is formed upon its outer face with lugs 156ª, which provide radial slots to cooperate with a roll 162 carried by a gear 159. Gear 159 is mounted upon a stud shaft 160 and driven through an idler 165 by a gear 164 fast on main shaft 102. The hub of gear 164 is made with a radial lug 164ª adapted to bear against a stop dog 115, Figure 7, pivotally mounted upon a stud 116 and held at its free end in the path of lug 164ª by a spring pressed plunger 117. Dog 115 is formed with a depending arm or finger co-operating with a cam surface 119ª provided upon a slide bar 119 mounted on frame section 101. This slide bar is acted upon by a spring 119ᵈ which normally urges said bar in the direction of the arrow, Figure 3. Near its middle the slide bar 119 is embraced by a yoke 120 which co-operates with two collars 119ᵇ fast on slide bar 119, said yoke being itself pinned to the inner end of a shaft 125 provided at its outer end with a handle 124. From the hub of yoke 120 projects a pin 120ª co-operating with one end of a lever 127 pivoted at 127ª upon the frame section 101. The other arm of lever 127 engages a slidably supported detent or pawl 126 co-operating with a notch or shoulder 119ᶜ formed on slide bar 119.

Loosely mounted upon the hub 113 of gear 164, is a sleeve 112 formed with cam pockets 112ª each holding a clutch roll 112ᵇ. These pockets and the rolls 112ᵇ are arranged within a cylindrical chamber 109ª formed in the hub of a gear 109. Between the flanges of hub 113 and of sleeve 112 is arranged a spring 113ᵇ, Figure 7, which abuts at one end against a pin carried by hub 113 and at its opposite end against a pin carried by sleeve 112. Sleeve 112 is also provided with a radially projecting lug 112ᶜ adapted to engage the end of stop dog 115 alongside of the lug 164ª of hub 113. The hub 113 is keyed to shaft 102, but the sleeve 112 is loose on the hub 113, so that it will be clear that when dog 115 is raised out of the path of lugs 164ª and 112ᶜ the spring 113ᵇ will act to rotate sleeve 112, the rolls 112ᵇ moving with the latter within the cam pockets 112ª on hub 113 in a direction to cause the rolls to clutch the continuously driven gear 109 to the hub 113 which is keyed to the shaft 102.

When it is desired to start the machine, the handle 124 is thrown to the left causing yoke 120 to shift slide bar 119 toward the left where it is caught and held by the latch or pawl 126. This movement of slide bar 119 toward the left causes the cam surface 119ª of said bar to lift stop dog 115 out of the paths of lugs 112ᶜ and 164ª which results in clutching gear 109 to the hub 113 and releasing shaft 102. By throwing handle 124 toward the right, pin 120ª will act through lever 127 to retract the pawl or latch 126 whereupon spring 119ª will throw slide bar 119 toward the right with the result that stop dog 115 is returned into the path of lugs 164ª and 112ᶜ, so that as soon as said lugs engage said dog, the gear 109 is unclutched, and, through the engagement of lug 164ª with dog 115, further rotation of shaft 102 is prevented.

It will be clear that for each revolution of shaft 102 the gears 156 and 157 are rotated 90° and since the ratio of said gears 156 and 157 and gear 155 is two to one, the shafts 153 and 154 will be moved 180° each time the gears 156 and 157 are rotated 90°.

Figures 17, 18:
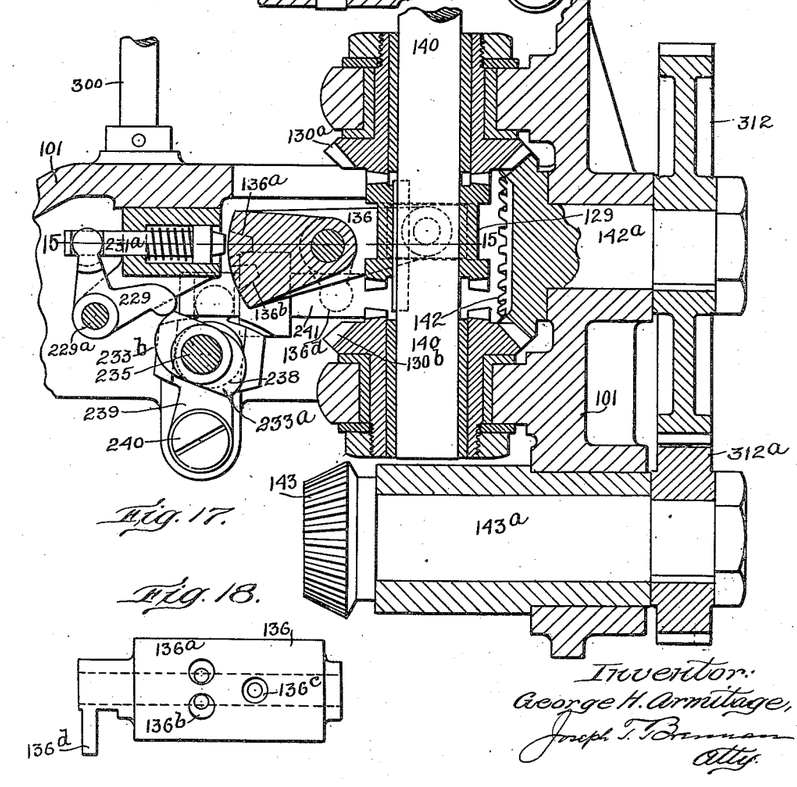
Figure 17 is a section on line 17—17 of Figure 13.
Figure 18 is an elevation of the clutch shipper lever hereinafter described.

The shuttle 281 is equipped with trucks 282 mounted upon a rail 291 that is fastened at its ends to brackets 277 and 278 projecting from a sub-frame section 279 that is secured to the top of a standard 314. To one side of shuttle 281 is secured one end of a cable 281ª which extends around a pulley or roll 285 mounted upon the outer end of bracket 278 and thence around a drum 320 secured to the upper end of a vertically disposed shaft 140, Figures 2, 13, and 17. From drum 320, the cable 281ª extends around another pulley 285, mounted on the outer end of bracket 277 and thence back to carriage 281 again to which the other end of said cord is fastened. The drum 320 is intermittently rotated, first in one direction and then in the opposite direction, and acts through the cable 281ª to move shuttle 281 back and forth from one side of the machine to the other, said shuttle moving across the machine, once for each revolution of main cam shaft 102.

The cord B from which the laces are made, is led from an elevated guide, not shown, down through a guide eye 281ᵇ on shuttle 281 and thence between guide rolls 284 at the lower end of said shuttle to one or the other of two anchors 153ª or 154ª carried, respectively, by shafts 153 and 154. Each anchor consists of a longitudinally adjustable hub fastened to its shaft and provided with a pair of radially extending arms positioned 180° apart. During the operation of the machine, the radial arms of each anchor are brought successively into position immediately to the rear of the stretch of cord that is laid across the machine by the carriage 281.

Figures 5, 6:
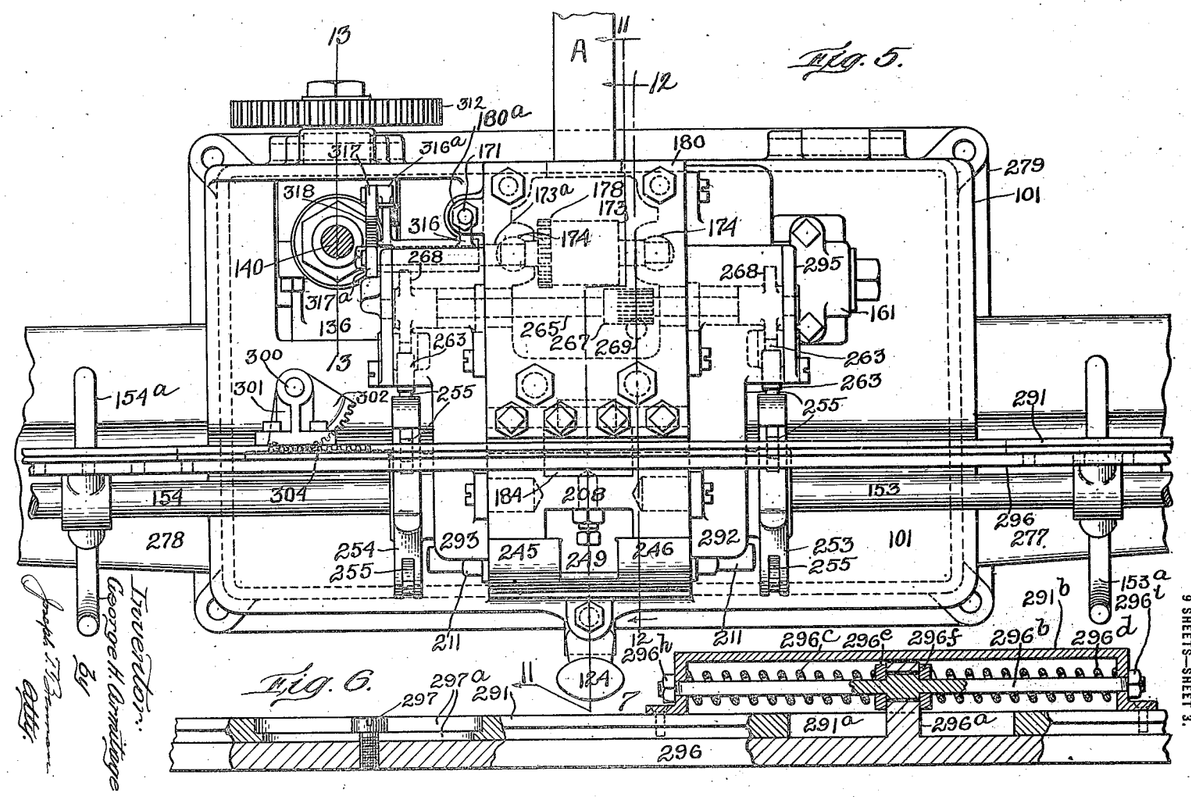
Figure 5 is a plan view of the parts shown in Figure 4.
Figure 6 is a detail relating to the shuttle control mechanism.

The movable jaws 255 of transfer members 253 and 254 are formed with tail pieces co-operating with two jaw-closing segments 263, Figures 5 and 7, engaged by segments 268. There are two pairs of segments 263 and 268, one at each side of the machine, one pair co-operating with the movable jaws of the transfer member 253, and the other co-operating with the movable jaws of the transfer member 254. The segments 263 are pivotally supported near the path of the tail pieces of the movable jaws by studs projecting from the frame of the machine, while the segments 268 are fast upon the opposite ends of a shaft 265 journaled near its ends in bearings on the frame of the machine. Shaft 265 carries a pinion 267 engaged by a rack bar 269 whose lower end is held in engagement with a lever 272 by a spring 269ª. Lever 272 is pivotally supported at 272ª and carries a cam roll engaged by a cam 271 on main shaft 102. While the stretch of cord $a$ occupies position $b$, Figure 11, and immediately after the shuttle 281 in moving across the machine, passes the second transfer member 253 or 254, the cam 271 acts through a lever 272, rack bar 269, shaft 265, and segments 268 and 263 to close the uppermost movable jaws of the transfer members 253 and 254. After the die member 183 has been raised and lowered to cut and wrap the piece of sheet metal around the stretch of cord $a$ at position $b$, the two transfer members 253 and 254 are simultaneously rotated 180°, thereby carrying the stretch cord $a$ bodily sidewise around into position $b'$. While the cord is at position $b'$, the jaws of the transfer members remain closed, but after slide 249 has been operated to cut and crimp during the next series of operations as described, transfer members 253 and 254 are again moved 180° and at the start of this movement the arms 258 strike abutment studs 258ª and through this engagement the movable jaws are opened, thus allowing the severed ends of the laces to fall by gravity. When the transfer members move from position $b$ toward position $b'$, the anchors 153ª and 154ª also move around at the same time engaging the cord and crossing the path along which said cord is stretched by the shuttle 281. Now, when carriage 281 is moved back to the opposite side of the machine again, the cord is wrapped around the anchor which it first passes, said cord then extending from position $b'$, where it is held by the jaws of the transfer members, to the last mentioned anchor, around the latter and then back across the machine at position $b$ to the shuttle 281.

The shaft 140 which carries the shuttle actuating drum 320 has splined upon it a clutch member 129 co-operating with a bevel gear 130ᵇ located beneath said clutch member and a bevel gear 130ª located above said clutch member, the adjacent faces of said bevel gears being provided with clutch surfaces to co-operate with the end clutch surfaces of the member 129. The two bevel gears are engaged and driven by a third bevel gear 142 whose shaft 142ª carries at its outer end a gear 312 driven by a pinion 312ª fast on the outer end of the shaft 143ª of a bevel gear 143 that is in mesh with a bevel gear 145 fast on main shaft 102. Clutch member 129 is engaged by shipper 136 having an arm 136ᵈ occupying a position between two springs 136ᶠ and 136ᵍ within a tube 241 slidably mounted in position on the frame.

The tube 241 is engaged by the upper end of a lever 239 fulcrumed at 240 on a stud projecting from the frame, said lever being formed with a yoke embracing an eccentric 238 fixed on a short shaft 235 journaled in bearings on the frame. Shaft 235 has a gear 236 fast on it that is driven by a pinion 237 fast on main shaft 102, the shaft 235 making one-half of a revolution for each revolution of main shaft 102, and acting through eccentric 238 and lever 239 to slowly reciprocate the tube 241 endwise. The tube 241 is shifted endwise from one extreme of its movement to the opposite extreme during each rotation of main shaft 102, thus causing the springs within the tube 241, acting against arm 136ᵈ, to yieldingly urge the shipper 136 first in one direction and then in the opposite direction.

The length of travel of the shuttle 281 in either direction is limited by the engagement of the latter with one or the other of two blocks 298 fastened by screws to a bar 296 that is slidably mounted upon the front side of rail 291. This slide bar 296 is formed with a series of tapped screw holes to provide for adjustment of the blocks 298 lengthwise thereof so that the distance traveled by the shuttle 281 may be varied according to the length of lace desired.

Upon the rear side of slide 296 is fastened a rack 304, Figure 5, engaging a segment 302 fast upon the upper end of a vertical shaft 300 journaled in bearings on the frame. At its lower end, shaft 300 is formed with a cam surface 300$^a$, Figure 15, co-operating with a lever 227 that is in engagement with a spring pressed bolt or latch 231 mounted in a bracket 230 secured to the frame. During the time that carriage 281 is moving across the machine in either direction, means provided at 291$^b$, Figure 1, (see also Figure 6) holds the slide bar 297 in an intermediate or neutral position with the cam recess 300$^a$ in an intermediate position, leaving bolt 231 free to be held projected and in operative position by its spring. During the travel of the shuttle 281 across the machine in either direction, clutch member 129 is held locked in engagement with one of the gears 130$^a$, or 130$^b$, through the engagement of bolt 231 with shipper 136, and at the same time eccentric 238 is moving yoke 239 and barrel 241 in a direction to move the shipper 136 into neutral position, but since said shipper is locked at one extreme of its movement by bolt 231 the only result of this endwise movement of barrel 241 is to compress one of the springs within said barrel. When, however, the shuttle 281 reaches the end of its travel and, through its engagement with one of the blocks 298, moves slide bar 296 endwise the movement of rack 304 therewith acts through segment 302, shaft 300 and lever 227 to retract bolt 231 and free shipper 136. When thus freed the shipper 136 is thrown into neutral position by the barrel spring that was compressed acting against arm 136$^d$, said shipper being stopped and locked at neutral position by another spring pressed bolt 231$^a$. Bolt 231$^a$ is engaged by a bell-crank lever 229 fulcrumed on bracket 230 and co-operating with a pair of cams 233 fast on shaft 235, said cams being 180° apart and acting to retract bolt 231$^a$ once during each revolution of main cam shaft 102, at the completion of each revolution of the latter and immediately after the transfer members 253 and 254 have been moved 180° to carry the just delivered stretch of cord from position $b$ to position $b'$.

It will thus be clear that the bolt 231 serves to lock the shipper in either extreme position and is automatically controlled by the shuttle so as to unlock the shipper and permit one or the other of the springs within barrel 241 to throw the shipper 136 into neutral position when said shuttle reaches the end of its movement in either direction. The compressed barrel spring is not exhausted in moving the shipper into neutral position so that it will also be clear that when bolt 231$^a$ is shortly thereafter retracted by one of the cams 233 acting through bell-crank 239, said spring will continue the movement of the shipper into its opposite extreme position where it will be locked by the bolt 231 as soon as the shuttle 281 has moved reversely far enough to permit the means at 291$^b$ to restore slide bar 296 to its neutral or intermediate position. The purpose, then, of the bolt 231$^a$ and its controlling and operating devices is to synchronize the movements of the shuttle with relation to the movement of the main cam shaft 102 by effecting the start of the travel of the shuttle in either direction at the same moment during each revolution of the main cam shaft regardless of mis-timing occasioned by the movement of clutch member 129 into and out of engagement with gears 130$^a$ and 130$^b$.

Figures 1, 2, 3:
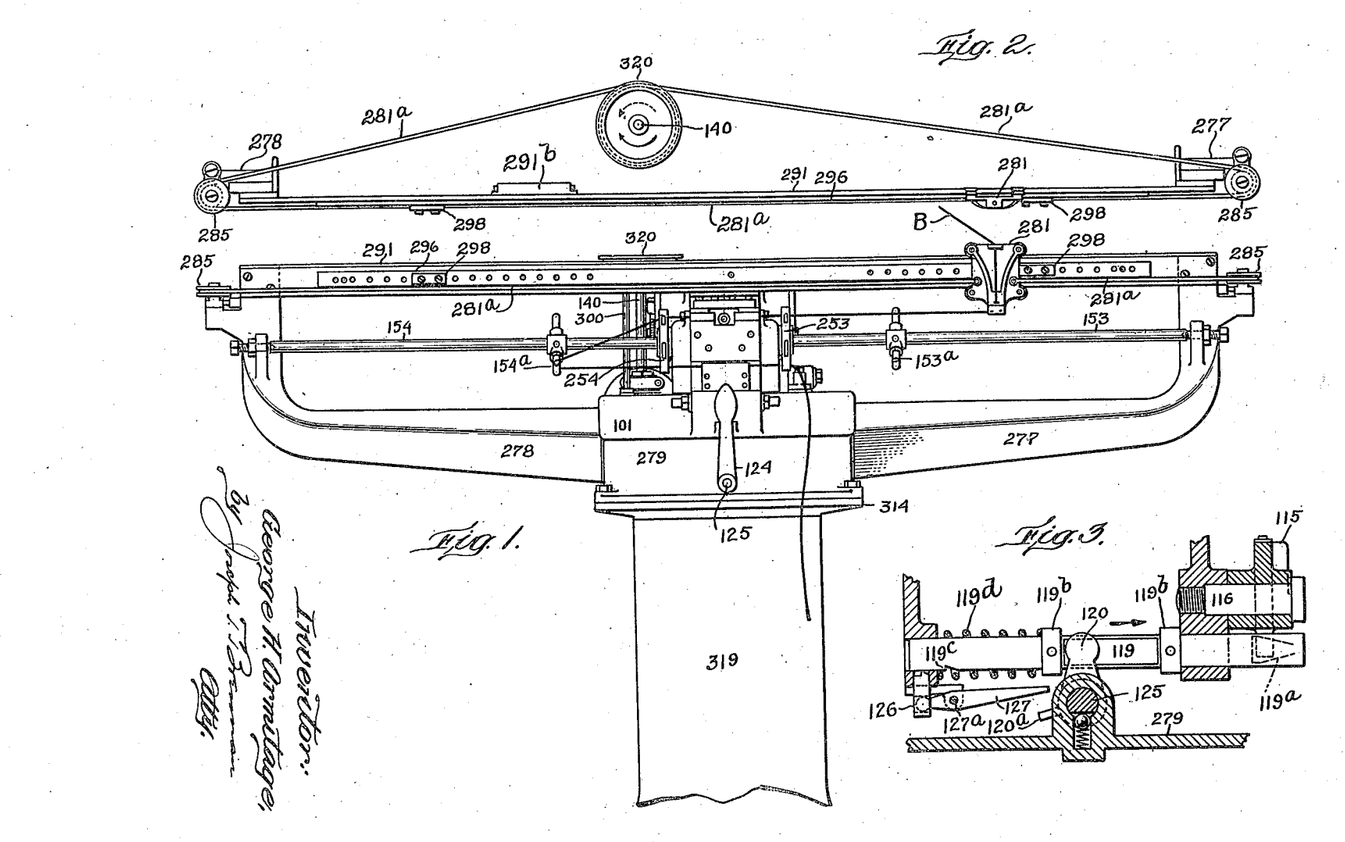
Figure 1 is a front elevation of a machine for making shoe laces and the like embodying the invention.
Figure 2 is a plan view of a portion of the machine shown in Figure 1.
Figure 3 is a detail relating to the control mechanism.
Figures 15, 16:
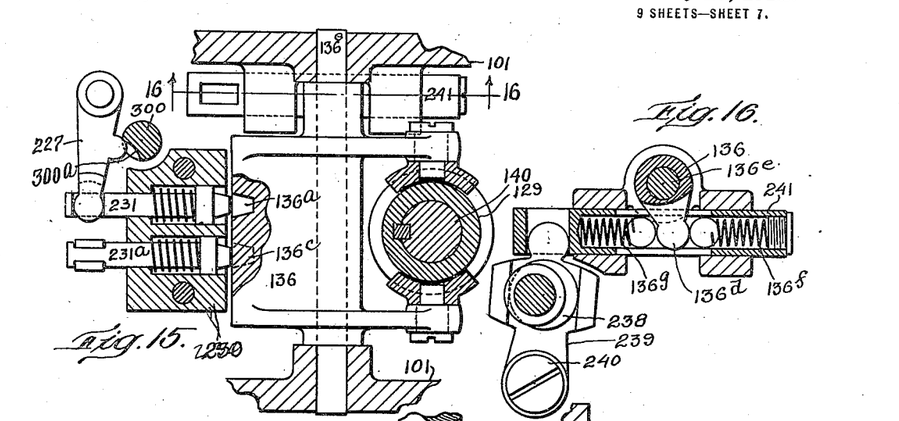
Figure 15 is a section on line 15—15 of Figure 17.
Figure 16 is a section on line 16—16 of Figure 15.

The operation of the shuttle controlling and actuating devices for each cycle of the machine is as follows:

In Figure 1 of the drawings the shuttle 281 is shown at the limit of its travel toward the right, said shuttle having engaged the block 298 at the right and moved the slide bar endwise toward the right. This movement of slide bar 296 toward the right acts through rack 304 and segment 302 to rock shaft 300 in a direction to cause its cam surface 300$^a$, Figure 15, to retract bolt 231 which, when followed by the retraction of bolt 231$^a$, allows spring 136$^g$ to swing shipper 136 in a direction to carry the clutch member 129 into engagement with bevel gear 130$^a$. Now, when the machine is started by operating handle 124, as described, the gear 130$^a$ acts through clutch member 129, shaft 140, drum 320 and cable 281$^a$ to move shuttle 281 across the machine toward the left. As the shuttle 281 leaves the block 298, the means provided at 291$^b$, Figure 2, shifts slide bar 296 toward the left into its intermediate position which results in positioning the cam surface 300$^a$ in an intermediate position so that bolt 231 is thrown forward into socket 136$^a$ thus locking shipper 136 against displacement until the shuttle reaches the limit of its movement toward the left. During the travel of the shuttle toward the left, the tube 241 is slowly moved endwise toward the left in Figure 17 by eccentric 238 acting through lever 239, thereby compressing spring 136$^f$. When shuttle 281 engages the block 298 at the left and shifts slide bar 296 toward the left the latter acts through rack 304 and segment 302 to rotate shaft 300 in a clockwise direction; Figure 15, whereupon the cam surface 300ª, moving from its intermediate position, acts through lever 227 to retract bolt 231, thus allowing the just compressed spring 136ᶠ, acting against the arm 136ᵈ, to throw shipper 136 to its middle or neutral position where it is caught and held by the engagement of bolt 231ª with socket 136ᶜ. This, of course, stops further movement of the shuttle toward the left. Shortly thereafter the shaft 235 completes its half revolution bringing a cam 233 into engagement with bell-crank lever 229 through which it acts to retract the bolt 231ª whereupon the said spring 136ᶠ continues the movement of shipper 136, carrying the member 129 into engagement with the gear 130ᵇ. This results in reverse motion of shaft 140 and drum 320 so that the shuttle is started on its travel toward the right hand side of the machine. As the shuttle passes out of engagement with the block 298 the means at 291ᵇ restores slide bar 296 to its intermediate position again which, as will be clear, returns the cam surface 300ª by a contra-clockwise movement of shaft 300, to its intermediate position again, thus allowing the bolt 231 to engage the socket 136ᵇ so as to lock the shipper 136 against displacement until the shuttle reaches the limit of its travel toward the right.

During this travel of the shuttle from left to right, the eccentric 238 acts through lever 239 to slowly shift tube 241 in the opposite direction, thereby compressing spring 136ᵍ preparatory to the reversal of the position of shipper 136 which takes place when the shuttle reaches the limit of its travel toward the right. When the shuttle, traveling toward the right, engages the block 298 at that end of slide bar 296, the latter is shifted endwise by the shuttle from its intermediate position thus producing a further contra-clockwise movement of shaft 300 and causing the cam surface 300ª to again retract bolt 231, whereupon the just compressed spring 136ᵍ throws the shipper 136 toward its neutral position where it is caught and held by the bolt 231ª again. Shortly after the shuttle reaches the limit of its travel toward the right, the shaft 235 completes the half revolution accompanying that movement of the shuttle and one of the cams 233 acts through bell-crank 229 to retract bolt 231ª, thus permitting the spring 136ᵍ to complete the movement of the shipper which shifts the clutch member back into engagement with the bevel gear 130ª and restores the parts to the positions shown in Figures 1, 15, 16 and 17.

Slide bar 296 is fastened to the rail 291 by means of screws 297, Figure 6, extending through slots 297ª provided in said rail 291. Projecting from the rear side of slide bar 296 is an arm 296ª which extends through a slot 291ª into a box or frame 291ᵇ secured to the rear side of rail 291. Near its outer end this arm 296ª is formed with a hole through which extends a bolt or bar 296ᵇ secured at its ends to the box 291ᵇ. Upon the bar 296ᵇ are mounted two springs 296ᶜ and 296ᵈ which abut at their outer ends against the ends of box 291ᵇ and at their inner ends against washers 296ᵉ and 296ᶠ. These washers in turn bear against the opposite sides of the arm 296ª and also against shoulders at the opposite ends of an enlargement provided at the middle of bar 296ᵇ. It will thus be clear that during the travel of the shuttle across the machine in either direction the two springs 296ᶜ and 296ᵈ serve to hold the slide bar 296 in an intermediate or neutral position and that said slide bar is free to be moved endwise by the shuttle when the latter engages either block 298. Also that as the shuttle passes away from each block 298 at the start of its movement in either direction the slide bar 296 is immediately shifted into its intermediate position, thereby locking shipper 136 against movement or displacement until the slide bar is again moved endwise which occurs when the shuttle reaches the opposite side of the machine.

Figures 13, 14:
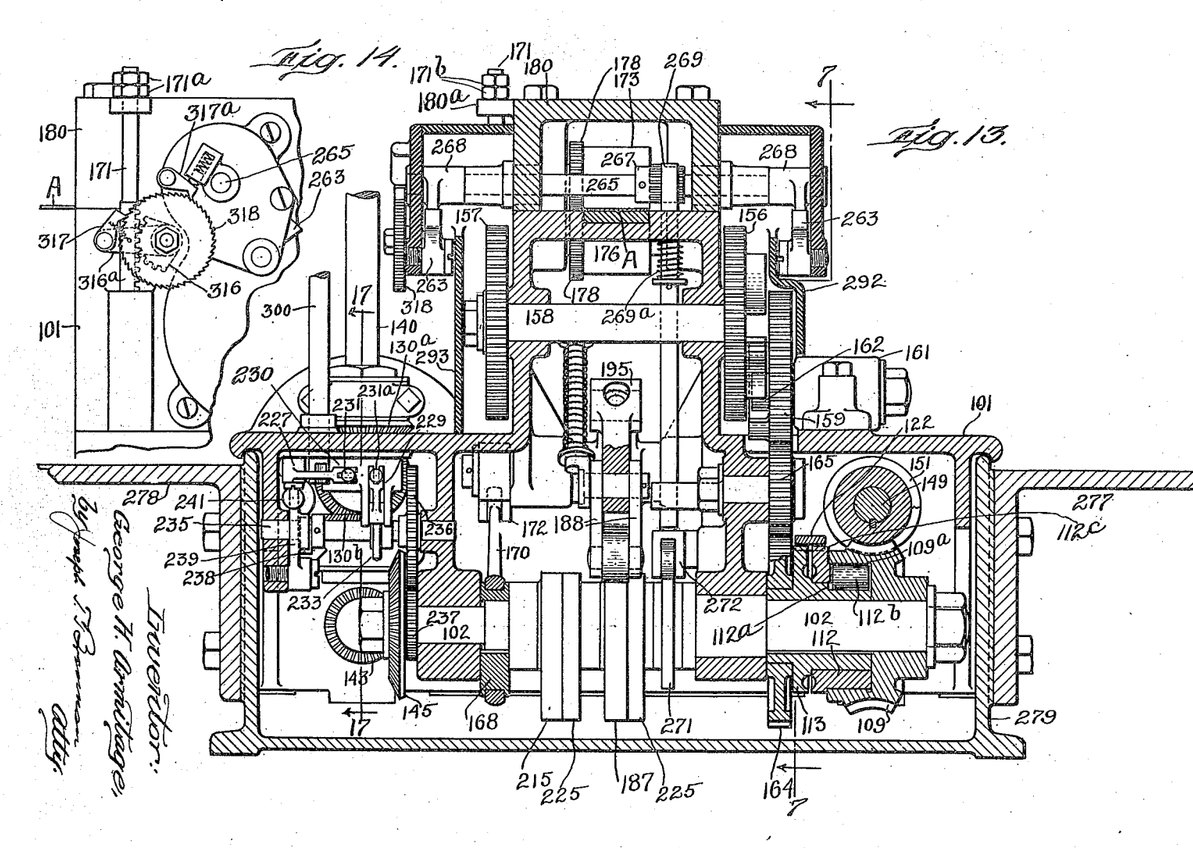
Figure 13 is a section on line 13—13 of Figure 7.
Figure 14 is an elevation of a portion of the structure shown in Figure 13, viewed from the left.

Gear 109, Figure 13, is preferably driven by a worm 151 fast on the main drive shaft 149 to which power may be applied in any suitable manner.

The above described machine operates continuously and automatically to produce individual laces, each provided at its opposite ends with beaded sheet metal tips. If desired, however, the beading blades may be dispensed with so as to cause the machine to produce laces with plain tips.

I claim as my invention:—

1. In a machine of the character described, the combination with tip applying mechanism and severing means, of a shuttle by which a continuous lace cord or the like is continuously engaged and delivered directly to said mechanism; means for reciprocating said shuttle back and forth past said mechanism in timed relation with the latter; a pair of anchors between which said mechanism is arranged, said anchors alternately co-operating with said shuttle to present measured lengths of cord to said mechanism; means for operating said anchors; a pair of transfer members between which said mechanism is arranged, and means for intermittently operating said transfer members to cause them to grip each stretch of cord and transfer the same bodily sidewise to the severing means after a tip has been applied thereto by said mechanism.

2. In a machine of the character described, the combination with tip applying mechanism and severing means, of a pair of rotatably supported anchors between which said mechanism is arranged; a cord guiding shuttle movable back and forth past said anchors to loop a continuous lace cord or the like alternately around said anchors and present a stretch thereof directly to said mechanism; means for operating said guiding shuttle; a pair of rotatably supported transfer members between which said mechanism and severing means are arranged; and means for intermittently rotating said anchors and transfer members to cause them to transfer the stretches of cord bodily sidewise from the tip applying mechanism to the severing means.

3. In a machine of the character described, the combination with tip applying mechanism and severing means, of a pair of rotatably supported anchors; means for looping a continuous lace cord or the like alternately around said anchors; a plurality of pairs of rotatably supported grippers, each pair engaging the cord at each side of the place where a tip is applied and the cord is severed; means for operating said pairs of grippers to cause each to grip the cord and transfer a tipped stretch thereof from the tipping mechanism to the severing means and to hold the cord until another pair of grippers is closed upon the latter.

4. In a machine of the character described, the combination with tip applying mechanism, of means for feeding measured lengths of a continuous lace cord or the like to said mechanism, said cord feeding means comprising a shuttle continuously engaging and directly delivering said cord or the like to said mechanism; a shuttle supporting rail; means for reciprocating said shuttle back and forth past said mechanism in timed relation with said mechanism; a pair of anchors between which said mechanism is arranged, said anchors alternately co-operating with said shuttle to present measured lengths of the cord to said mechanism, and means for operating said anchors.

5. In a machine of the character described, the combination with tip applying mechanism and severing means of a shuttle continuously engaging a lace cord or the like and delivering the same directly to said mechanism; a shuttle supporting rail; means for reciprocating said shuttle back and forth past said mechanism in timed relation with the latter; a pair of anchors between which said mechanism is arranged, said anchors alternately co-operating with said shuttle to present measured lengths of cord to said mechanism; means for operating said anchors; a pair of transfer members between which said mechanism is arranged, and means for intermittently operating said transfer members to cause them to grip each stretch of cord, to transfer said stretch of cord bodily sidewise to the severing means after a tip has been applied thereto by said mechanism; and to hold said cord until the next stretch of cord has been presented to said mechanism.

6. In a machine of the character described, the combination with tip applying mechanism, of means for feeding measured lengths of a continuous lace cord or the like to said mechanism comprising a reciprocating shuttle continuously engaging said cord or the like and means for operating said shuttle to cause it to deliver measured stretches of said cord or the like directly into position to be operated upon by said mechanism.

7. In a machine of the character described, the combination with tip applying mechanism, of means for feeding measured lengths of a continuous lace cord or the like to said mechanism comprising a reciprocating shuttle continuously engaging said cord or the like; means for operating said shuttle to cause it to deliver measured stretches of said cord or the like directly into position to be operated upon by said mechanism, and means for severing the cord and tip transversely near the middle of the latter.

8. In a machine of the character described, the combination with tip applying mechanism, of means for feeding measured lengths of a continuous lace cord or the like to said mechanism comprising a reciprocating shuttle continuously engaging said cord or the like; means for operating said shuttle to cause it to deliver measured stretches of said cord or the like directly into position to be operated upon by said mechanism; means for severing the cord and tip transversely near the middle of the latter, and means for transferring each stretch of cord with the applied tip on it from said tip applying mechanism to said severing means.

Signed at Cranston, Rhode Island this 23rd day of July 1918.

GEORGE H. ARMITAGE.